Sept. 6, 1960     D. GOOD     2,951,665
HIGH SPEED PARACHUTE
Filed May 3, 1957     2 Sheets-Sheet 1
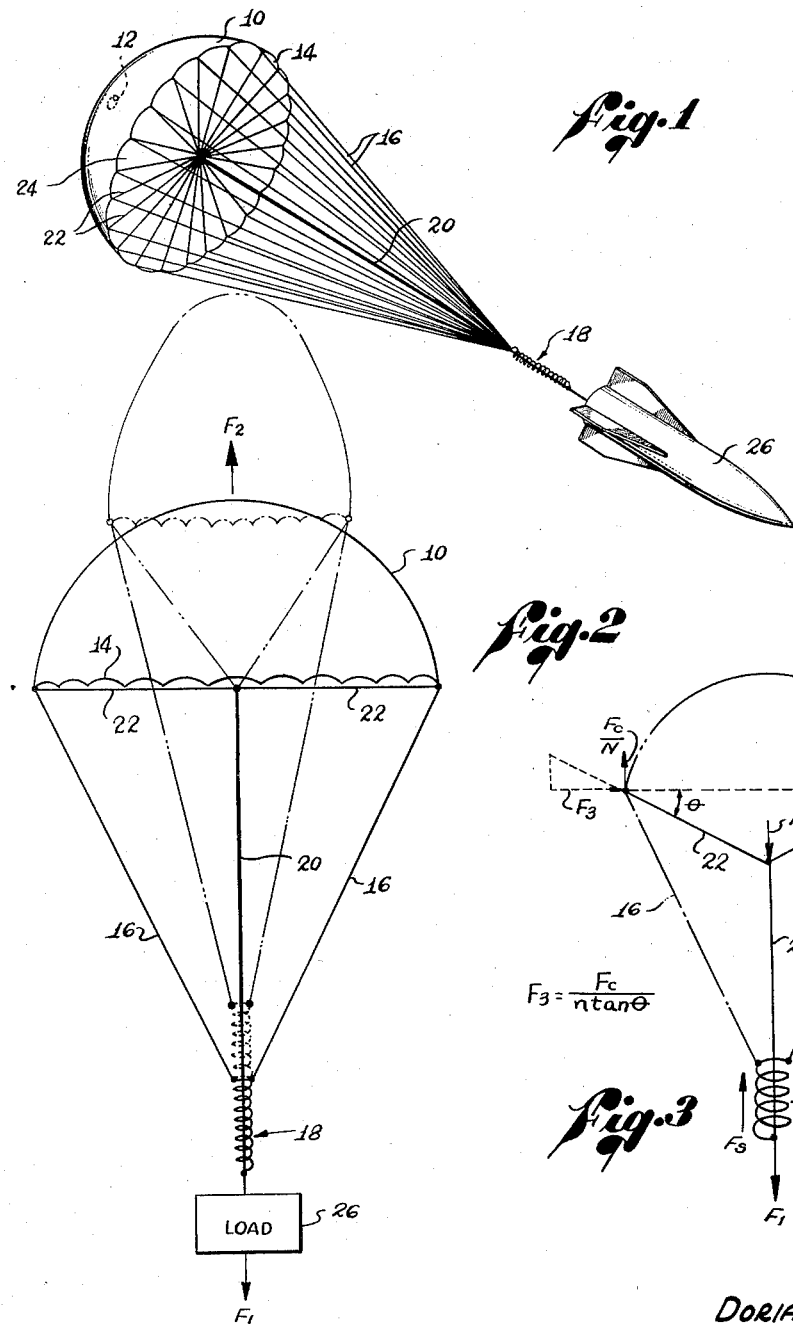
INVENTOR.
DORIAN GOOD
BY
Attorney Sept. 6, 1960 D. GOOD 2,951,665
HIGH SPEED PARACHUTE
Filed May 3, 1957 2 Sheets-Sheet 2
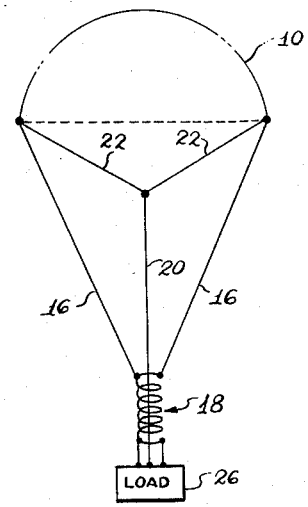
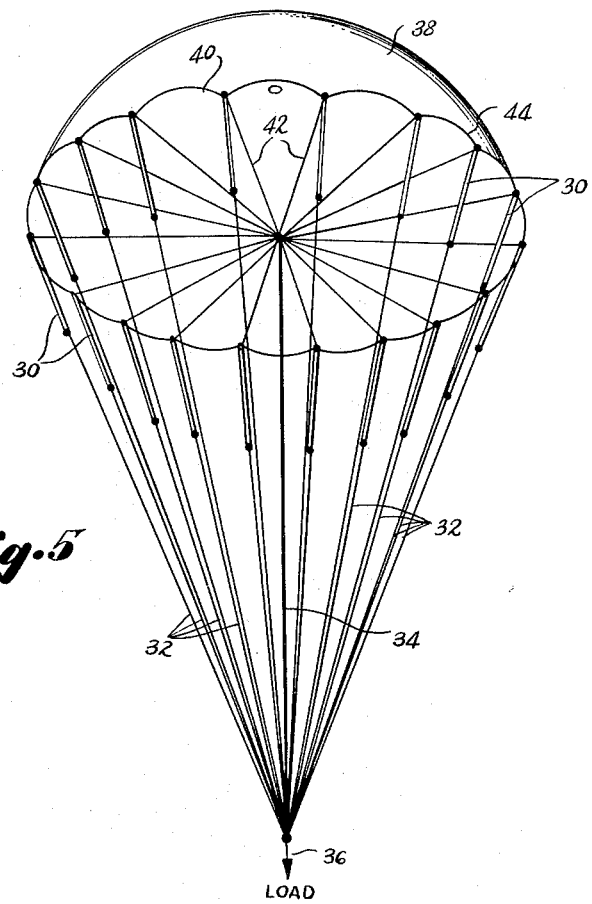
INVENTOR.
DORIAN GOOD

2,951,665

HIGH SPEED PARACHUTE

Dorian Good, Altadena, Calif.
(8077 McDermott, Reseda, Calif.)

Filed May 3, 1957, Ser. No. 656,892

1 Claim. (Cl. 244—145)

This invention relates to parachutes, and particularly to parachutes for use with relatively high speed or massive loads.

Parachutes of the type to which this invention pertains are intended primarily for release from high speed aerial vehicles, either during flight or landing, for the purpose of braking the same or slowing their descent to earth, and for use in air drops of relatively heavy equipment.

For example, it is frequently desirable to retrieve rockets and guided missiles at the termination of their flight. To this end, parachutes have been carried by some types of missiles to provide for gradual descent thereof to earth. In those rockets and missiles which are fired vertically, the parachute is generally released when the missile attains its maximum altitude, whereat its speed is at a minimum. The drag and inertial forces involved are, therefore, relatively small so that parachutes of more or less conventional design may be employed.

So-called ground-to-ground missiles, on the other hand, follow a generally horizontal trajectory. The speed of such missiles is diminished only slightly during flight, and, in most cases, will be relatively high at the time the parachute is released. Conventional parachutes, obviously, are not suited to use with these latter missiles, owing to the extremely large drag and inertial forces involved which would cause rupturing of the canopy or parting of the shroud lines of the chute.

Similar obstacles are encountered in the use of parachutes for braking high speed aircraft during landing or air drops of excessively heavy equipment. Various types of parachutes have, therefore, been designed for these specialized uses such as the well-known ribbon chute and others.

A broad object of this invention is the provision of a new and improved parachute for use on high speed aerial vehicles and in air drops of heavy equipment.

A more specific object of the invention is the provision of a parachute of the character described, having means for causing automatic collapse of its canopy under excessive applied loads, whereby excessive initial strain in the canopy and shrouds of the chute is avoided.

Another object of the invention is the provision of a parachute of the character described which is automatically adjustable in response to initially high and gradually diminishing drag and inertial forces thereon to effect a minimum frontal area immediately after release and gradual enlargement of the frontal area to its maximum value as the object to which the parachute is attached decelerates under the braking effect of the chute.

A further object of the invention is the provision of a parachute of the character described which is relatively simple in construction and operation and inexpensive to manufacture.

Briefly, the foregoing and other objects are achieved in the primary illustrative embodiment of the invention by the provision of a canopy of essentially conventional design to the periphery of which are attached the upper ends of a series of shrouds. Also attached at one end to the periphery of the canopy, at the points of attachment of the shrouds thereto, are a series of radial lines.

These radial lines are of a length substantially equal to the radius of the canopy when the latter is fully open and have their other ends secured to the upper end of a central line. The lower end of the central line is rigidly anchored to the load or object to be carried by the chute. In the normal floating position of the chute, this central line hangs coaxial with the canopy.

The lower ends of the shrouds are connected to the central line, adjacent its lower end, or directly to the load, through a yieldable elastic coupling. The spring constant of this elastic coupling is preselected in accordance with the weight of the load or the acceleration forces involved, as will be explained.

The coupling is so preadjusted that when the chute is in a state of dynamic equilibrium, i.e., falling at substantially a constant speed so that the load is subject to no acceleration or deceleration forces, the weight of the load will be substantially entirely carried by the shrouds through the coupling.

In this normal state of the chute, the tension in the central line above the coupling is substantially zero, and the radial lines extend in the plane of the open side of the canopy, the latter being fully expaned.

Immediately after release of the chute from a high speed missile, for example, the drag force on the canopy, which force is exerted on the upper end of the coupling through the shrouds, and the inertial force on the load, which force is exerted on the lower end of the coupling, cause the latter to yield against the action of the elastic means therein. A strain is thereby created in the central line tending to pull the latter and the inner ends of the radial lines attached thereto axially away from the canopy.

The resulting strain in the radial lines draws the lower circular edge of the canopy radially inwardly with a resultant decrease in the effective frontal area of and, therefore, the drag force on the canopy. The chute is so designed that the initial partial collapse of the chute in this fashion will be sufficient to reduce the drag force below a value which would cause rupturing of the canopy or parting of the shrouds. As the load decelerates under the drag of the partially collapsed chute, the drag force on the canopy gradually decreases and the latter is gradually returned to to its fully expanded condition under the action of the new tensed elastic coupling.

In an alternative form of the invention, a series of elastic elements are connected in the shrouds of the chute in lieu of employing a single elastic coupling between the shrouds and central line.

The invention briefly described above may be better understood from the following detailed description, wherein reference is had to the accompanying drawings, in which:

Figure 1 is a view in perspective of one form of the present parachute;

Figure 2 is a diagrammatic view illustrating the present chute in solid line, fully open condition and phantom line, partially collapsed condition;

Figure 3 is a force diagram illustrating the canopy collapsing forces involved in the present chute;

Figure 4 illustrates a modified form of the present chute; and

Figure 5 illustrates a still further modified form of the present chute.

Referring first to Figures 1 through 3 of these drawings, the numeral 10 designates the canopy of the present chute. This canopy may be of conventional stitched panel construction and, in its fully opened condition, shown in Figure 1, is of generally hemispherical shape. The canopy may have a conventional upper vent port 12, if desired.

Fixedly attached, in any suitable manner, to the normally lower circular edge 14 of the canopy 10 are a series of shroud lines 16. Shroud lines 16 are of substantially equal length and have their lower ends firmly secured to a yieldable elastic coupling 18.

Coupling 18 may assume various physical forms in a practical embodiment of the present chute. For simplicity of illustration and description, however, the coupling 18 has been diagrammatically shown as comprising a simple coil tension spring having its upper end secured to the lower ends of the shroud lines 16.

The lower end of the coupling spring 18 is firmly attached to a central line 20 which illustratively extends axially through the spring. The upper end of the central line 20 is affixed to the inner ends of a series of radial lines 22. In the normal opened condition of the chute, the central line 20 extends coaxial with the canopy 10.

Radial lines 22 are equal in number to the shroud lines 16 and have their outer ends secured to the circular edge 14 of the canopy 10 at the points of attachment to the latter of the shroud lines 16. The radial lines 22 are approximately equal in length to the radius of the circular edge 14 of the canopy 10 when the latter is fully open, as illustrated in Figure 1.

Accordingly, in the fully expanded or opened condition of the canopy 10, the upper end of the central line 20 will be located substantially in the plane of the normally lower, open side 24 of the canopy 10, and the radial lines 22 will extend in this plane, as will shortly be more fully explained.

The load 26 to be carried by the chute is firmly anchored to the lower end of the central line 20. As preliminarily mentioned, this load may comprise a high speed missile or rocket, a piloted, high speed aircraft, or a piece of relatively massive equipment, such as a piece of ordnance equipment, to be dropped from the air. In each instance, the chute, prior to its release, will be folded and stored on the load, in any conventional manner.

In the case of an unpiloted missile or rocket, release of the chute is effected in any suitable manner at or near the termination of powered flight of the missile or rocket in order to provide for gradual descent thereof to earth. The missile or rocket may thereby be retrieved for study or further use.

Assume for the moment a condition wherein the present parachute, carrying a given load 26 and falling freely under the force of gravity with its canopy expanded to its maximum diameter and frontal area, as illustrated in solid lines in Figure 2, has attained a state of dynamic equilibrium, i.e., a state wherein the chute and load are falling at substantially a constant speed determined by the combined weight of the load and chute and the frontal area of the latter. In this state of equilibrium, the load is subject to no acceleration or deceleration forces, and, therefore, the downward force F1, exerted by the load on the lower end of the central line 20, equals the weight of the load. The upwardly acting drag force F2 on the canopy, of course, equals the downward force F1, when the chute is in the aforesaid state of equilibrium.

The spring 18 or other elastic coupling is so chosen and it and the central line are so preadjusted that in this normal condition of the chute, the load is substantially entirely carried by the shroud lines 16 through the elastic coupling and the upper end of the central line 20, and, therefore, the radial lines 22 are located in the plane of the open side 24 of the canopy 10. The tension, hereinafter referred to as initial tension, in the coupling 18 under these conditions substantially equals the weight of the load. The central line 20 is placed under only light tension sufficient to maintain it in a taut condition.

In use of the present chute, the inertial force F1 on the load and the drag force F2 on the canopy will be relatively large immediately after release of the chute from a high speed missile, for example, and substantially greater than the corresponding forces existing in the normal state of equilibrium of the chute. Elastic coupling 18 will yield in response to these large forces, the central line 20, in effect, being pulled away from the canopy 10 against the action of the coupling. The inner ends of the radial lines 22 are thereby also pulled away from and thus exert radially inward forces on the circular edge 14 of the canopy tending to collapse the latter and reduce its frontal area, as shown in dotted lines in Figure 2.

The elastic coupling 18 is preselected to have a spring constant such that under the maximum forces encountered immediately after release of the chute, the coupling will yield to a predetermined extent corresponding to predetermined partial collapse of the canopy. The chute is so designed that for a given load and air speed at the time of release, the partial collapse of the canopy is sufficient to reduce its frontal area, and, therefore, the drag force, below values which would cause rupturing of the canopy or parting of the lines.

The effectiveness of the central and radial lines in collapsing the chute will be apparent from Figure 3 wherein it can be seen that the radial inward force component F3 exerted by each of radial lines on the circular edge of the canopy may be expressed by the equation $$F3 = \frac{Fc}{N \tan \theta}$$

wherein $Fc$ = the tension in the central line
$N$ = the number of radial lines
$\theta$ = the angle between the radial lines and the plane of the open side 24 of the canopy.

The angle $\theta$, of course, is approximately zero when the canopy is fully open so that the initial radial forces F3 tending to collapse the canopy will be extremely large. These forces F3 will, of course, decrease as the canopy collapses. The forces resisting collapse, however, will also decrease.

As the load decelerates as a result of the braking effect of the partially collapsed chute, the forces F1 and, therefore, F2 and F3 gradually decrease and the canopy is gradually expanded to its full diameter and frontal area under the combined action of the now tensed elastic coupling and the outward force of air on the canopy.

It will be apparent from the foregoing description that the lower end of the elastic coupling 18 may be secured directly to the load, as indicated in Figure 4. In some cases, the entire coupling might be contained within the load.

An alternative form of the invention is illustrated in Figure 5, wherein in lieu of the single elastic coupling 18 of Figures 1 through 4, a series of yieldable elastic elements 30 are employed. In Figure 5, the lower ends of the shroud lines 32 are attached directly to the central line 34 and load 36.

The upper ends of the shroud lines 32 terminate a distance below the canopy 38 and are secured to one end of the elastic elements 30. The other ends of the elastic elements are fixed to the circular edge 40 of the canopy 38. A series of radial lines 42 extend from the points of attachment of the elastic elements to the canopy to the upper end of the central line. The radial lines 42 have a length approximately equal to the radius of the mouth, or lower open side, 44 of the canopy 38 in the fully open condition of the latter.

Operation of this modified chute is similar to that previously described. Thus, the elastic elements 30 yield in response to the initial large drag and inertial forces immediately after release of the chute. The central line 34 and radial lines 42 are, in effect, thereby pulled away from the canopy 38 to collapse the latter as before.

The size and spring constants of the elastic elements will be so chosen that when the chute is in the normal state of equilibrium, previously discussed, substantially the entire load will be carried by the shrouds 32 and elastic elements 30, the tension in the central line 34 being just sufficient to maintain the same in a taut condition. The radial lines 42, under these conditions, extend in the plane of the open side of the canopy. The aforementioned initial large collapsing forces are thereby developed by the radial lines.

While certain embodiments of the invention have been described and shown for illustrative purposes, it will be apparent that numerous modifications in design and arrangement of parts are possible within the scope of the following claim.

I claim:

A parachute comprising: a canopy having a generally hemispherical shape and a lower, generally circular edge in its normal fully open condition, a series of radial lines secured at one end of each to said edge at points substantially equally spaced therearound and having a length approximately equal to the radius of said edge, a central load line secured at its normally upper end to the other ends of said radial lines and having its other end adapted to be attached to a load, a series of shroud lines of equal length secured at their normally upper ends to said edge at points substantially equally spaced therearound, and a single elastic element having an upper end and a lower end, the upper end of said elastic element secured to the normally lower ends of said shroud lines and the lower end of said elastic element being secured to said central load line above the lower end of the latter line.

References Cited in the file of this patent
UNITED STATES PATENTS

| | | |
|---|---|---|
| 1,340,259 | Taylor | May 18, 1920 |
| 2,371,898 | Lisi | Mar. 20, 1945 |
| 2,384,127 | Nailor | Sept. 4, 1945 |
| 2,709,054 | Roth | May 24, 1955 |
| 2,721,716 | Beadle | Oct. 25, 1955 |